Figure 1:
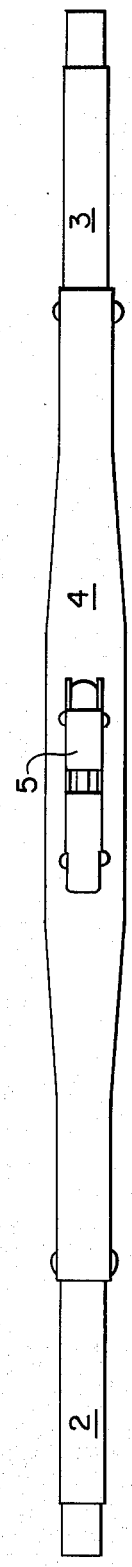

United States Patent [19]

Smollett et al.

[11] 3,963,530

[45] June 15, 1976

[54] STAINLESS STEELS COATED WITH BLACK OXIDES

[75] Inventors: Thomas J. Smollett; Bozidar Stipanovic, both of Waukegan, Ill.

[73] Assignee: Coral Chemical Company, Waukegan, Ill.

[22] Filed: Oct. 24, 1974

[21] Appl. No.: 517,657

Related U.S. Application Data

[63] Continuation-in-part of Ser. No. 431,770, Jan. 8, 1974, Pat. No. 3,915,759.

[52] U.S. Cl. .............................. 148/31.5; 148/6.11; 15/250 R
[51] Int. Cl.² .......................................... C23F 7/04
[58] Field of Search ................. 148/6.11, 6.14, 6.2, 148/6.35, 31.5

[56] References Cited

UNITED STATES PATENTS

| | | | |
|---|---|---|---|
| 2,431,986 | 12/1947 | Clingan | 148/6.11 |
| 2,537,035 | 1/1951 | Clingan | 148/6.11 |
| 2,537,830 | 1/1951 | Holden | 148/15 |
| 2,542,994 | 2/1951 | Cobb | 148/6.11 X |
| 2,618,578 | 11/1952 | Kreml | 148/6 |
| 3,125,471 | 3/1964 | Conner | 148/6.35 X |
| 3,437,532 | 4/1969 | Helgert et al. | 148/6.11 X |
| 3,645,802 | 2/1972 | Keough | 148/15 |

*Primary Examiner*—Ralph S. Kendall
*Attorney, Agent, or Firm*—John S. Roberts, Jr.

[57] ABSTRACT

A firmly adherent black oxide coating for chromium-containing martensitic and ferritic stainless steel substrates, particularly windshield wiper blade assemblies, consisting essentially of $(Fe,Cr)_2O_3$ and $Fe_3O_4$.

6 Claims, 5 Drawing Figures

STAINLESS STEELS COATED WITH BLACK OXIDES

REFERENCE TO RELATED APPLICATIONS

This application is a continuation-in-part of our co-pending application, Ser. No. 431,770, filed Jan. 8, 1974, now Pat. No. 3,915,759, entitled "Black Oxide Coating for Stainless Steels."

This invention relates to a black-colored oxide coating on the surface of chromium-containing stainless steel alloys, especially of the ferritic or martensitic types.

The invention further relates to a process for producing an adherent black-colored oxide coating on the surface of chromium-containing ferritic or martensitic stainless steel alloys by heating stainless steel workpieces in fused potassium hydroxide, fused sodium hydroxide, or a fused mixture of alkali metal hydroxides, into which steam is injected to maintain an effective concentration of water in the fused bath. The steam is preferably added continually during the entire heating step of the process in order to replenish water lost during the process and to maintain the activity of the fused bath. It should be understood, however, that the introduction of steam in this invention is not used in a limiting sense, but as an efficient and convenient way to compensate for the loss of water from the fused salt bath due to evaporation and further that the black-oxide coating of this invention need not be limited to that produced by this method alone.

PRIOR ART

The prior art pertinent to the present invention consists of the use of molten alkaline or neutral salt baths, which in all cases are substantially anhydrous and contain at least one oxidizing agent.

Thus, in U.S. Pat. No. 2,479,979, Spence et al. (Hooker) teach a procedure using an anhydrous fused alkali bath with 5–10% of an oxidizing agent at temperatures of 550°–1100°F. for 1–25 minutes. U.S. Pat. Nos. 2,618,578 by Kreml (Armco), 2,537,035 by Clingan (Armco), and 2,542,994 by Cobb (Armco) describe the use of various molten alkali metal dichromate compositions, all of which appear to be anhydrous, in blackening stainless steel alloys. In U.S. Pat. No. 2,431,986 by Clingan (Armco), an anhydrous molten salt bath consisting of alkali metal nitrates is claimed to produce in 5–40 minutes colored coating on stainless steel surfaces at 730°–840°F.

The products or methods disclosed in the prior art are objectionable for one or more substantial reasons, particularly in view of present-day preference for using economical types of corrosion-resistant stainless steel substrates having high mechanical and structural strength, even and especially under high dynamic stress conditions, for fabrication into automobile and aircraft windshield wiper assemblies, architectural panels, furniture, components of solar energy absorption devices, automobile trim parts, dishwasher parts, and the like.

For many of these applications, a black coating is preferred or required for aesthetic or safety reasons. In windshield wiper assemblies, a black coating is preferred to a bright coating in order to diminish glare and reduce driver or pilot fatigue, as well as for a pleasing decorative effect. Further, windshield wiper assemblies are often exposed to tough and adverse working conditions, such as high winds, snow, ice, and corrosive environments. Thus, an acceptable windshield wiper blade assembly, or the components thereof, is made from metal alloys having exceptional structural and corrosion-resistant properties so that the blade assemblies will perform reliably under high dynamic stress conditions without failure. Although both AISI 300 and 400 series stainless steels are suitable for these applications, the relatively more economical ferritic alloys of the 400 series are somewhat less resistant to corrosion.

Figure 2:
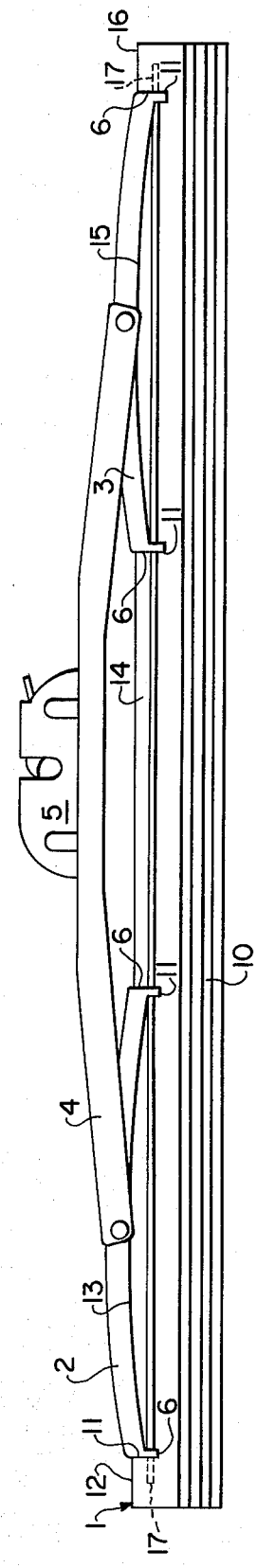

A typical windshield wiper blade assembly which is a coated product of this invention is depicted as FIGS. 1 and 2, wherein FIG. 1 is a top view of a windshield wiper blade assembly and FIG. 2 is a side view of the same assembly.

More particularly, the wiper blade comprises a resilient wiper element generally designated 1 and an elongate uniformly flexible support detachably secured together. The pressure-distributing device may be constructed in various ways, but, as herein illustrated, includes a pair of corresponding secondary yokes 2 and 3, a primary yoke 4, and a connector 5 for detachably connecting the assembly to a spring-pressed wiper arm. The ends of the secondary yokes are provided with receiving means 6 connected to the blade at longitudinally spaced points or locations and the ends of the primary yoke are pivotally connected to intermediate portions of the secondary yokes. The connector 5 is carried by the primary yoke.

The wiper element of the blade may be designed and constructed as desired, but as herein shown its sides are a neck or hinge portion 8. This element includes an attaching or back portion 9 and a wiper head portion 10 joined to the attaching portion by the hinge 8 so that the head portion may flop or move laterally with respect to the attaching portion when the blade is moved back and forth against a surface to be cleaned. The wiper element is also usually provided with four transverse slots or notches 11 which more or less divide the attaching portion of the wiper element into longitudinally extending portions 12, 13, 14, 15, and 16. Each end portion 12 and 16 of the element is provided with a pair of corresponding holes 17 which receive the ends of the flexible members. The wiper arm assembly comprising, as noted above, 12, 13, 14, 15, and 16, carries the flexible rubber wiper blade 10 which is carried across the windshield in a typical reciprocal wiping action.

Black stainless steel building or architectural panels are often preferred to bright stainless steel units for both appearance and low reflectivity. In solar energy absorptive devices, a black coating increases the efficiency of absorption of solar energy.

Of the black oxide coatings known in the prior art, the methods of Kreml, Cobb, and Clingan, supra, produce a satisfactorily adherent black oxide coating only on relatively expensive austenitic stainless steel alloys, which contain nickel as well as chromium. Thus, it will be apparent that there is a continuing need for an adherent black oxide coating on more economical types of stainless steel, more particularly the ferritic and martensitic chromium steels of the AISI 400 series, as well as a method of producing such coatings.

A further objection to the use of each of the foregoing methods is the fact that each relies on a medium containing chromium for the formation of the oxidic coating and that in each case the water baths in which the coated stainless steel workpieces are rinsed build up high concentrations of hexavalent chromium. The solutions of hexavalent chromium present a problem of disposal, especially in light of increasingly stringent state and federal pollution control standards.

Although phosphatized mild steel can be painted black, the use of black paint on stainless steel substrates has been less than satisfactory because of poor adhesion of the paint to the steel surface as well as because of the tendency of phosphatized mild steel to corrode at locations at which the paint coating has been damaged.

Thus, there exists a genuine and continuing need for firmly adherent black coatings for economical stainless steel alloys, especially ferritic and martensitic alloys of the AISI (American Iron and Steel Institute) 400 series. More particularly, there is a continuing need for firmly adherent black coatings on windshield wiper assemblies and components thereof, structural and architectural panels, components of solar energy absorptive devices, and the like fabricated from chromium steels of the ferritic and martenistic types.

It has been found, in accordance with this invention, that a firmly adherent black oxide coating consisting essentially of $(Fe,Cr)_2O_3$ and $Fe_3O_4$ on chromium-containing ferritic and martensitic stainless steel alloys of the AISI 400 series is obtained by heating steel workpieces in contact with a fused bath of potassium hydroxide, sodium hydroxide, or a mixture of alkali metal hydroxides, in which an effective level of water is maintained at 540°–720°F. for 1–30 minutes.

Thus, the product of this invention is a firmly adherent black oxide coating on chromium-containing ferritic and martensitic stainless steel alloy workpieces consisting essentially of $(Fe,Cr)_2O_3$ and $Fe_3O_4$ from about 1.5 up to about 4.5 $\mu$ in thickness from electron micrograph analysis. Generally, and preferably, the thickness of the coating is about 2–4 $\mu$.

The composition of the black oxide coating on stainless steel as determined by Electron Spectroscopy for Chemical Analysis (ESCA) and energy-dispersive x-ray analysis is essentially $(Fe,Cr)_2O_3$ and $Fe_3O_4$. An alternative representation of the essential composition of the coating is $FeO(Fe,Cr)_2O_3$.

The Electron Spectroscopy for Chemical Analysis (ESCA) technique enables an investigator to determine the chemical identity and valence state of atoms in a material by studying the energy distribution, i.e., binding energy, of electrons ejected from a sample which is bombarded by x-ray excitation. The method, which is also known as x-ray photoelectron spectroscopy (XPS), induced electron emision (IEE) and photoelectron spectroscopy of inner shells (PESIS), is described in a review article by W. E. Swartz, Jr., *Anal. Chem.* 45 (9), 789A (1973); instrumentation is reviewed by C. A. Lucchesi et al. (Northwestern University, Evanston, Illinois), *J. Chem. Ed.*, Vol. 50, No. 4 (April, 1973) at A 205 and No. 5 (May, 1973) at A 269. The value of the ESCA technique lies in its general applicability to all elements in the periodic table above helium and in its ability to determine oxidation states of all the elements.

The ESCA method, as particularly applied to corrosion research, is described by I. Olefjord, Chalmers University of Technology, Gothenburg, Sweden, in 6th Scandanavian Corrosion Congress, Gothenburg (1974), at 11-1. More particularly, as far as corrosion research is concerned, the electrons for which the binding energy is being determined emanate from the outermost atomic layers exclusively. Thus, the ESCA method is especially appropriate for the study of thin films, such as passivating or adsorbed layers or surface coatings of any type.

Figure 3:
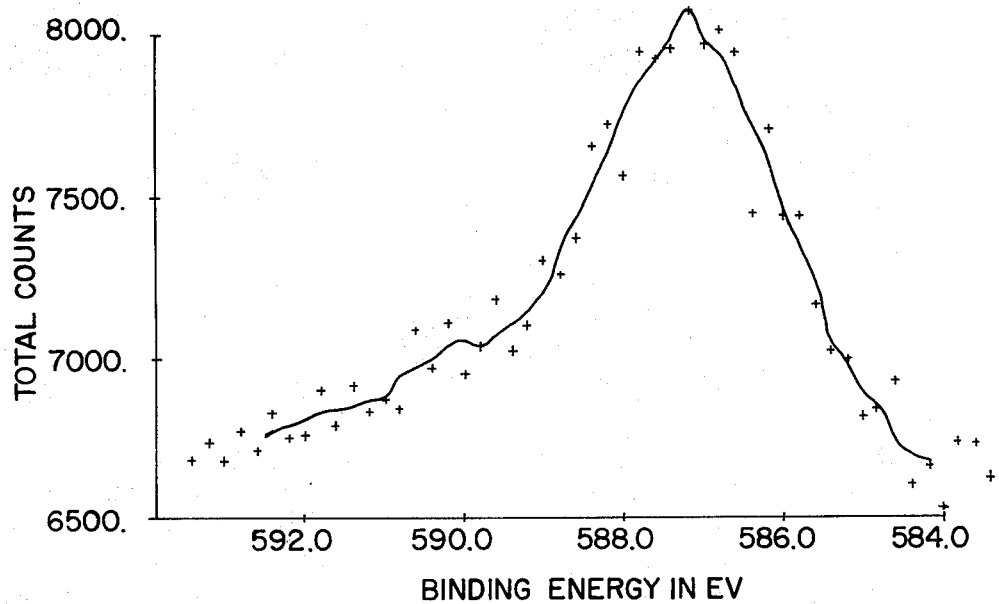
Figure 4:
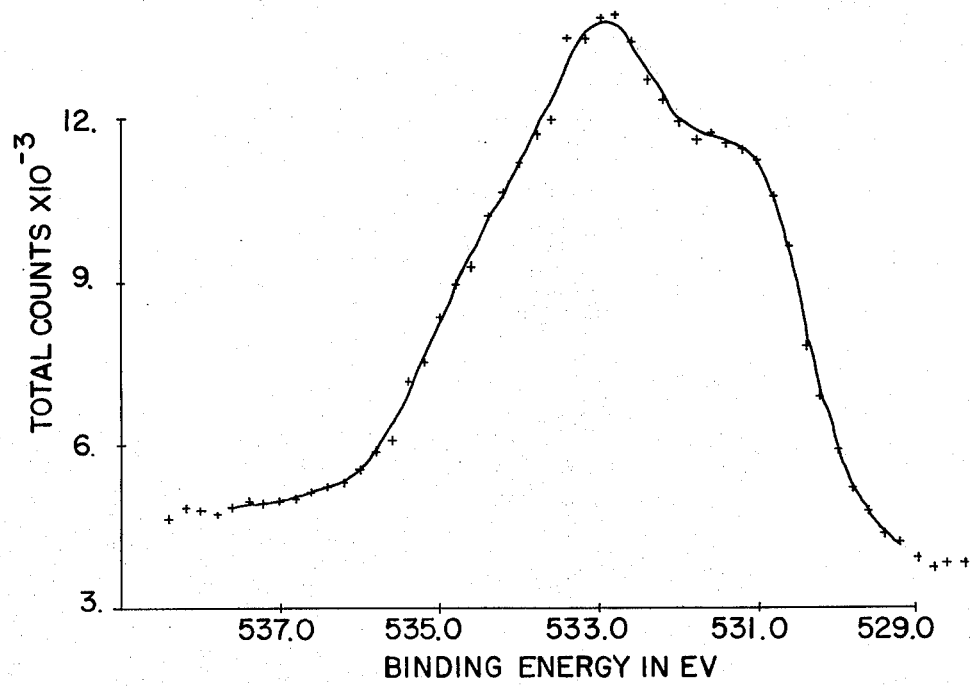
Figure 5:
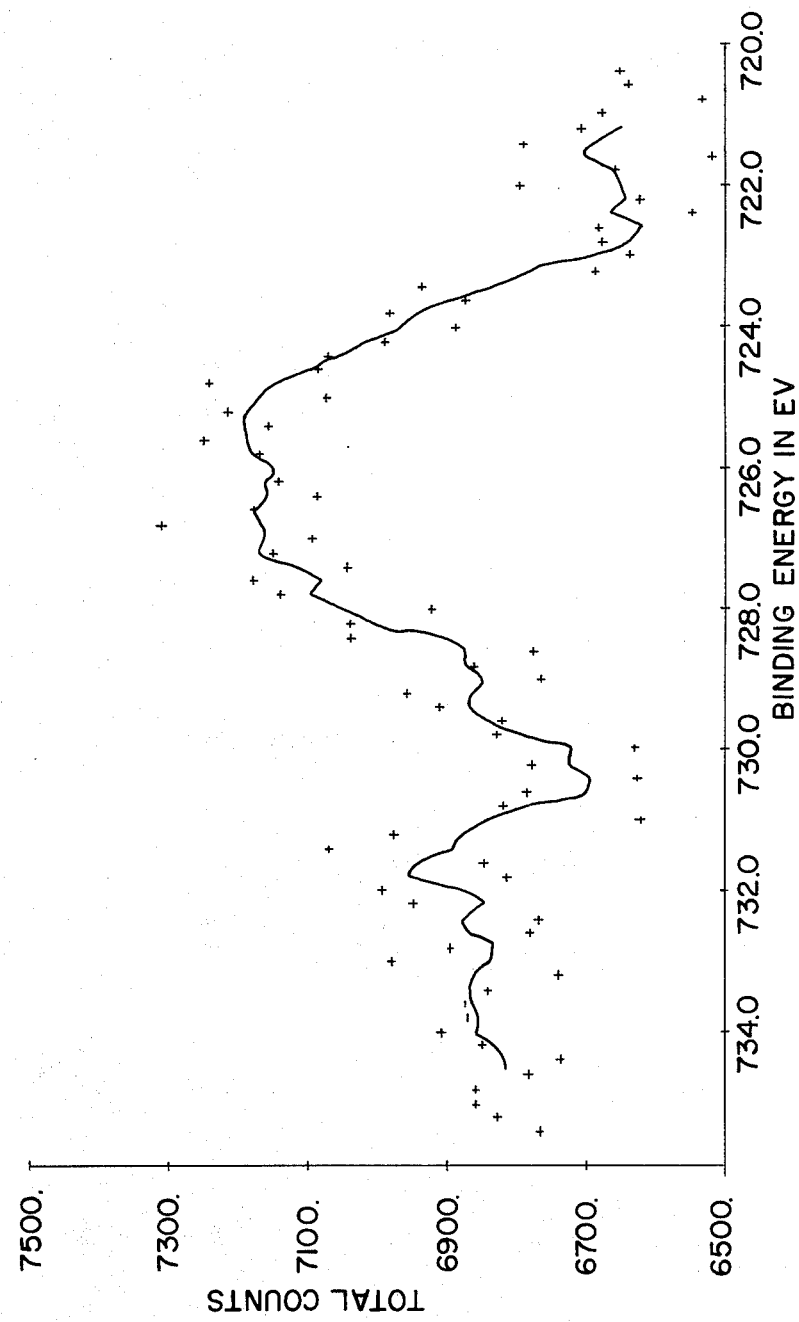

Selected portions of a wide span ESCA spectrum of the coatings of this invention are reproduced as FIGS. 3–5, wherein FIG. 3 is a computer controlled time-averaged scan for chromium $2p_{1/2}$, FIG. 4 for oxygen 1s and FIG. 5 for iron $2p_{1/2}$. Each of these scans is from a sample before ion-beam etching.

FIG. 3, which has a single peak in the Cr $2p_{1/2}$ region, indicates that the sample contains $Cr_2O_3$.

FIG. 4, for the O 1s region, has a left-hand peak of higher energy which is attributed to an oxide in which both iron and chromium are present in the trivalent stage, that is, a mixed crystal or solid solution of $\alpha$-$Fe_2O_3$ and $Cr_2O_3$ in the rhombohedral form. This mixed crystal or solid solution is represented by the formula $(Fe,Cr)_2O_3$.

The center peak in the oxygen region is attributed to an oxide of the spinel type, wherein iron is present in both divalent and trivalent states. Thus, this peak suggests the presence of $Fe_3O_4$ (or $FeO.Fe_2O_3$) in the coating sample.

The right-hand peak in the oxygen region (FIG. 4) is though to be produced by oxygen chemisorbed at the surface of the sample, because the peak disappears in the spectrum of an etched sample.

The section of the ESCA scan corresponding to the Fe $2p_{1/2}$ region is reproduced as FIG. 5 and, by comparison with standard scans, confirms the presence of divalent and trivalent iron, that is, $Fe_3O_4$, in the coating.

A minor component of the black oxide coating, as indicated by ESCA, is sodium, which appears as sodium 2s and sodium Auger (Auger KLL). Disappearance of both sodium 2s peak and sodium Auger line following ion bombardment suggests that the sodium is mainly at the surface of the black oxide film, possibly as $NaCrO_2$.

Elemental analysis of an unetched sample by energy dispersive x-ray analysis is consistent with the foregoing interpretation of the ESCA data. The concentrations of elements above atomic number 10, balanced to 100%, are:

| | |
|---|---|
| Na | 21.60 |
| Al | .12 |
| Si | .22 |
| S | .35 |
| K | .09 |
| Ca | .04 |
| Cr | 17.27 |
| Mn | .22 |
| Fe | 55.46 |
| Ni | .73 |
| Cu | .08 |
| Mo | 1.20 |

From the foregoing analytical data, it is to be understood that the black oxide coatings of this invention contain substantial amounts of trivalent chromium, that is, $Cr_2O_3$, despite the fact that no chromium source other than the ferritic or martensitic steel alloy is required. It will be appreciated that the chromium in the black oxide coating must, of necessity, come from the alloy itself and that the use of chromium from the alloy steels to form the black oxide coating may, in fact, account for the exceedingly superior anticorrosive and adhesive properties of the black oxide coatings of this invention over ferritic or martensitic alloys.

Stainless steel panels of the AISI 430 type coated with the black oxide coatings of this invention had excellent corrosion resistance according to the CASS test, American Society for Testing and Materials (ASTM) B368-68. Similarly, components of a windshield wiper assembly fabricated from AISI 434 stainless steel and coated with the coatings of this invention had excellent properties according to the CASS test, salt spray test (ASTM B117-64) and Kesternick test (DIN 50018).

As a substrate or workpiece material, as in the fabrication of windshield wiper blade assemblies, a stainless steel of the chromium-containing martensitic or ferritic type is used. Such steels are described in *The Making, Shaping and Treating of Steel* (U.S. Steel Corporation), 8, 1964, Chapter 45, especially page 1112, and also *The Encyclopedia of Chemical Technology*, II (Interscience-Wiley) Volume 18, 1969, at pages 790–791. Generally, when AISI-type steels are used, any of those designated in the 400 series on page 791 (ECT above) is operable for the purposes of the present invention.

With reference to the alkali metal hydroxide, an eutectic mixture of sodium and potassium hydroxides is preferred for the present invention due to the advantageously lower melting point, although under special circumstances, sodium hydroxide or potassium hydroxide may also be used in order of preference.

The thrust of this invention is in preferably continually adding water during the treating process to replenish and restore or maintain and augment the water content initially present in the fused salt mixture. The utilization of steam is a convenient was to supply water under the employed conditions, but this invention is by no means limited to this method of water addition. Intermittent steam or water addition may be utilized, but is not as efficient.

Heating is accomplished in an open vessel by dipping or suspending the metal article beneath the surface of a fused bath. By definition, "fused salt bath" in the present specification means sodium or potassium hydroxide or mixture of the same, which contain 3–8% water of hydration and as normally sold. Further, removal of water from commercial potassium hydroxide down to less than 6–8% would require extraordinary methods such as vacuum or by heating the fused material at temperatures higher than 550° F. for prolonged periods of time.

When the metal article is immersed in the fused salt bath and is heated for 2–30 minutes at a temperature of 540–720° F., water in the form of steam, preferably dry steam, is added through steam jets immersed in the molten bath and in an amount so that the total retained water amounts to about 2–15% by weight of the initial fused salt mixture. More restrictive but more effective ranges for water addtition are progressively about 2–12% and 3–8% by weight as above. At the end of treatment the stainless steel article, such as an automobile window wiper frame, is coated with a thin and very tight oxide layer, and is removed in blackened condition.

A preferred modus utilizes an eutectic mixture of fused salt (about 50% NaOH — 50% KOH) as a starting material, and into the mix may be added an oxidizing agent in the extent of 5–10% by weight of the initial salt mixture; as additive preferably an alkali metal molybdate is employed. Where the term "alkali metal" is used herein, it refers to sodium and potassium, e.g., hydroxides and molybdates. The utilization of an eutectic mix of sodium and potassium hydroxide, while not essential, is preferred because of a lower melting point which, in turn, enables one to discontinue the heat overnight without solidifying the bath. In other words, one may cool the bath down to 450°F. and still have a liquid. As oxidizing additives, an alkali metal molybdate such as sodium molybdate is preferred and utilized in amounts usually of 5–10% by weight of the fused salt mix.

WATER CONTENT

When the commercial grades of granular sodium and potassium hydroxide are intimately mixed in equal weight proportions, calculations confirmable by chemical analysis show that the mixture will contain approximately 3–5% water by weight. We have discovered that when such a mixture is heated in an open vessel until melted and heating is continued until a temperature in the range of approximately 540°–720°F. is attained, the resulting fused salt bath is effective in imparting black coatings to AISI 400 series stainless steels immersed therein. The bath is found to be effective, however, only so long as a substantial portion of water is retained, and the effectiveness is virtually lost if the bath is allowed to become substantially anhydrous due to evaporation.

This discovery is illustrated by an experiment in which 1000 grams each of commercial granular sodium and potassium hydroxides were intimately admixed. The mixture was found to contain 4.7% by weight of water. The mixture was placed in an open beaker made of AISI series 300 stainless steel and rapidly heated with a Meker burner. Approximately one-half hour was required to melt the mixture and raise the temperature to 580°F. Thereafter the temperature was maintained at 580° ± 10°F. for several hours while periodic tests were performed to evaluate the effectiveness of the molten mixture in blackening AISI 434 stainless steel. Samples of the molten mixture were taken periodically during this period and analyzed quantitatively for carbonate ion and hydroxide ion by the alkalimetric titration method described in F. J. Welcher, Ed., "Standard Methods for Chemical Analysis", Van Nostrand Reinhold Co. (1963), Vol. IIA, page 602. The sum of the sodium and potassium percentages present in each titration sample was calculated from (1) the total alkalinity value of the sample, and (2) the ratio of sodium and potassium in the original mixture. The percentage of water in each sample was determined by difference, i.e., by deducting from 100% the sum of the carbonate ion, sodium ion, sodium and potassium percentages.

During the aforesaid testing procedure, the water content of the molten mixture was also assayed by a second method wherein the entire bath vessel and contents were weighed periodically. By making corrections for (1) sampling losses, (2) drag-out losses, and (3) carbonate accumulation resulting from reaction between air-borne carbon dioxide and the alkaline metal hydroxides, a net bath weight was obtained. Differences between the original net bath weight of 2000 grams and subsequent experimentally determined values for the net bath weight were attributed to changes in the water content from the original 4.7% by weight.

As shown in Tests Nos. 1 and 2 in Table I, the molten mixture was initially effective in imparting a desirable black color to the stainless steel. As the bath aged, however, its water content progressively decreased due to evaporation until ultimately the blackening power was lost (Tests Nos. 4, 5 and 6).

TABLE I

Treatment of AISI 434 Stainless Steel Specimens With Molten Mixture of 50% (Wt.) Granular Sodium Hydroxide - 50% (Wt.) Granular Potassium Hydroxide[a]

| Test No. | Bath Age, Minutes at 580°F.[b] | Specimen Immersion Time, Minutes | Average Water Content Wt.%[c] | Appearance of Coating on Test Specimens | |
|---|---|---|---|---|---|
| | | | | Apparent Thickness | Color |
| 1 | 3 | 12 | 4.4 | Thick | Black with smut |
| 2 | 40 | 12 | 3.4 | Moderate | Black |
| 3 | 82 | 12 | 2.5 | Thin | Blue-Black |
| 4 | 140 | 12 | 1.8 | Thin | Brown |
| 5 | 211 | 12 | 1.3 | Thin | Brown |
| 6 | 309 | 60 | 0.9 | Thin | Brown |

[a] Initial net weight of molten mixture was 2000 grams. Treatment temperature was 580 ± 10° F.
[b] Elapsed time between instant when bath first reached 580° F. and instant when test specimen was immersed.
[c] Average of values determined by two methods described in text.

We have discovered that the loss of effectiveness discussed and illustrated in the preceding paragraphs can be prevented or reversed by injecting water, most conveniently in the form of steam, directly into the molten bath. This is illustrated by a continuation of the experiment described in the preceding paragraph and in Table I wherein steam was injected into the de-activated bath until the water content exceeded 8% by weight. The steam was injected into the molten mixture over a period of 110 minutes by means of an apparatus essentially identical to that in FIG. 1. Upon termination of the steam injection, the molten mixture was maintained at 580° ± 10° F. for several hours while periodic tests were performed to assay the water content and to evaluate the effectiveness in blackening AISI 434 stainless steel. The results are presented in Table II.

A comparison of these results with those in Table I indicates that the steaming process restored the effectiveness of the bath for blackening and that the effectiveness was then retained until in Test No. 10 the water content was again allowed to reach a low value due to evaporation.

TABLE II

Treatment of AISI 434 Stainless Steel Specimens With Steam-Reactivated Molten Mixture of 50% (Wt.) Granular Sodium Hydroxide - 50% (Wt.) Granular Potassium Hydroxide[a]

| Test No. | Bath Age, Minutes at 580° F.[b] | Specimen Immersion Time, Minutes | Average Water Content, Wt.%[c] | Appearance of Coating on Test Specimen | |
|---|---|---|---|---|---|
| | | | | Apparent Thickness | Color |
| 7 | 3 | 12 | 8.4 | Thick | Black with smut |
| 8 | 27 | 12 | 6.1 | Moderate | Black with smut |
| 9 | 65 | 12 | 3.6 | Moderate | Black with smut |
| 10 | 169 | 12 | less than 2.0 | Thin | Light Blue-Brown |

[a] Reactivated bath described in Table I was steamed in the molten state until water content exceeded 8%.
[b] Elapsed time between termination of steaming step and immersion of test specimen.
[c] Average of values determined by two methods cited in text.

Based on these experiments and data from the literature, the water content required for effective blackening is approximately 2.3%, but it may range up from 1% in some special circumstances. The important point is that injection of steam produces beneficial results, and that those skilled in the art will be capable of adjusting the steam injection rate so as to maintain the desired degree of effectiveness as to water content. In connection with this, it was found that when steam is injected into the bath at a relatively low rate and a relatively low but efficient water concentration is thereby maintained, the resulting coatings tend to possess a relatively thin and shiny appearance. Conversely, when the steam injection rate is relatively high and the water concentration is relatively high but within the range covered by our claims, the resultant coatings tend to possess a relatively thick and dull appearance. This invention thus affords the user a broad selection of attainable results.

The following examples are illustrative of the practice of this invention; however, the invention is not intended to be limited by the details set forth in these examples.

EXAMPLE I

Effect of Water Addition on the Blackening Process

The following mixture consisting of:

| | |
|---|---|
| KOH, Flake | 475 g. |
| NaOH, Flake | 475 g. |
| $Na_2MoO_4$ | 50 g. |
| | 1000 g. | was heated and melted in an AISI 300 series stainless steel beaker. The vessel was weighed from time to time in order to observe eventual loss of weight. After melting, the above mixture was heated and maintained at a temperature of 550°–600° F., while specimens of AISI 434 stainless steel were blackened by immersing them for 5–10 minutes into the molten mixture. The coatings were black, thin, and very tight; they could not be rubbed off even by rubbing hard with steel wool. After 2½ hours, the net weight dropped to 958 grams (corrected for dragout losses). The los of 4.2% was attributed to the evaporation of water initially present in the mixture. The observed weight loss paralleled the loss of blackening activity: specimens immersed for 10 minutes acquired only very thin, irridescent coatings. The bath was allowed to cool down, then 41 grams of water were added. The heating was resumed and the bath showed that its blackening activity toward AISI 434 stainless steel was restored.

EXAMPLE II

Molten Bath Activity Depending on Introduction of Steam

In order to prevent or reverse the loss of small amounts of water necessary for the blackening process, a continual water addition was an essential factor. An apparatus described in FIG. 1 was set up. The initial bath composition was identical with one described in Example I. Bath activity in blackening of AISI 434 stainless steel was studied as a function of water absorption via steaming, using weight changes to assay water content changes. The bath at 575° F. was active at the initial net weight as previously described in Example I, as well as when the net weight gain was about 4%. When the net bath weight loss reached about 3%, the activity was diminished.

Addition of 100 grams of $Na_2CO_3$ did not destroy the activity of the bath. Therefore, pick-up of $CO_2$ from the air should not be considered detrimental to the bath and no special precautions to exclude the contact with the same were undertaken.

EXAMPLE III

Molybdate-Free Molten KOH-NaOH Bath With Steam Introduction

The following initial bath composition was employed in this experiment:

| | |
|---|---|
| KOH, Flake | 1000 g. |
| NaOH, Flake | 1000 g. |
| | 2000 g. |

Water content was varied by changing the rate of steaming so that net bath weight was changing from 1927 to 2160 g. Satisfactory coatings on AISI 430 stainless steel panels were obtained at the net weights above 1960 g. At the net weight of 2160 g. and 480° F. 430 stainless steel panels were still reacting but hydrogen evolution did not stop even after 20 minutes of treatment and the resulting coating was very smutty and of poor adherence. At 600° F. and at net bath weight of 2010 to 2065 g., the coating process was very fast and in 2 minute contact time a satisfactory coating was formed.

EXAMPLE IV

Effect of Major Process Variables on Appearance and Corrosion Resistance of AISI 430 Stainless Steel As set out in Table II and in a number of experiments therein, stainless steel panels were black coated by the process of the present invention and then challenged by the CASS test (ASTM B368-68), which is a corrosion test utilizing a mixture of a copper chloride and acetic acid in order to accelerate the corrosive effects of a salt spray. The resistance to corrosion is measured under a sliding scale of 1 to 10. The results uniformly showed that there was good to excellent resistance to corrosion in the panels noted.

The results also showed that a satisfactory adherent, black coating may be obtained by the present process, which, dependent upon water content and temperature, may be varied from dull to shiny, dependent upon the market request.

TABLE III

Treatment of AISI 430 Stainless Steel Under Various Conditions
Bath consisting of initial 2000 g. of NaOH + KOH eutectic mixture (1:1 ratio by weight) with 0–10% of $Na_2MoO_4$. In each experiment 5 panels (2" × 1½") of AISI 430 stainless steel were simultaneously processed under different sets of conditions. The water content was maintained constant throughout an experiment by the addition of steam.

| | Experiment Number | | | | | | | | | | |
|---|---|---|---|---|---|---|---|---|---|---|---|
| | 1 | 2 | 3[a] | 4 | 5 | 6 | 7 | 8 | 9 | 10 | 11 |
| % of Sodium Molybdate | 0 | 0 | 0 | 5 | 5 | 5 | 5 | 5 | 5 | 10 | 10 |
| Bath Temperature, ° F. | 580 | 580 | 580–595 | 580 | 580 | 580 | 550 | 620 | 580 | 580 | 580 |
| Contact Time, Minutes | 10 | 10 | 10 | 10 | 10 | 30 | 10 | 10 | 10 | 10 | 10 |
| Net Bath Weight[b] | 2045 | 2020 | 2020 | 2049 | 2020 | 2021 | 2017 | 2020 | 1989 | 2052 | 2024 |
| Estimated Water Content, gr.[c] | 145 | 120 | 120 | 149 | 120 | 121 | 117 | 120 | 89 | 152 | 124 |
| % of Water in Bath | 7.1 | 5.9 | 5.9 | 7.2 | 5.9 | 6.0 | 5.8 | 5.9 | 4.5 | 7.4 | 6.1 |
| Gas Evolution Rate | Fast | Fast | Fast | Fast | Fast | Fast | Slow | Very fast | Med. | Fast | Fast |
| Gas Cease Time, Minutes | 3–4 | 4 | 4 | 5–6 | 7 | 7–8 | 7–10 | 2–3 | 8 | 7–8 | 9–10 |
| Coating (Reflectiveness* | D | S | D | D | S | S | D | S | S | D | D |
| Appearance (Color - Smut* | B Sm | Bl-B | B Sm | Bl-B | Bl Sm | Bl-B | Bl-B | Bl-B | Bl-B | B Sm | B Sm |
| Average Corrosion[d] Resistance | 6.0 | 6.9 | 5.8 | 8.7 | 4.5 | 6.6 | 2.5 | 8.2 | 8.8 | 5.1 | 8.5 |

[a]Panels etched in a mixed hydrofluoric/nitric acid etching composition, rinsed and dried prior to blackening.
[b]Corrected for drag-out (panels weighed with solidified drag-out, then washed, dried and weighed again). Drag-out represents a small amount of bath material.

[c]Commercial caustic soda (NaOH) and caustic potash (KOH) flake contain about 6% of water (Encyclopedia of Chemical Technology, II, Volume 1, page 753, and Volume 16, page 391). Therefore, an initial charge of 2000 g. is assumed to contain 120 g. of water ± amount of water introduced or evaporated in the form of steam
[d]Cass Test ASTM B368-68. All the panels submitted to maximum of 4 cycles consisting of 16 hours of active exposure in the Cass cabinet. Observations were made after each cycle and panels with signs of corrosion were removed. Number of cycles before failure and the extent of corrosion were rated as follows:

10 points = no corrosion after 4 cycles
7-9 points = no corrosion after 3 cycles
3-6 points = no corrosion after 2 cycles
1-2 points = corrosion during first cycle
*D = Dull
S = Shiny
Bl = Blue
B = Black
Sm = Smut

EXAMPLE V

Components of a windshield wiper assembly fabricated from AISI 434 stainless steel by the Anderson Co. of Gary, Indiana, and coated according to the foregoing examples (Coral Chemical blackening processes 1129 and 1130) were covered by a film which was deep black in color, thin and light, and very firmly bound to the metal surface. The surface coating was very hard and scratch resistant and had high resistance to corrosion, according to the CASS test (ASTM B 368-68), salt spray test (ASTM B 117-64) and Kesternick test (DIN 50018).

Regardless of whether the parts were etched or sandblasted prior to the fabrication of the black coating thereon, the stainless components coated with the black oxides of this invention had markedly better resistance to corrosion than conventionally treated windshield wiper assembly components.

EXAMPLE VI

A stainless steel (AISI 434) wiper blade was coated with black oxides according to Example IV, Experiment No. 2 and subjected to ESCA at the Chemistry Department of Northwestern University. A wide open scan spectrum was taken (kinetic energy from 500 to 1500 eV) of samples before and after etching with an argon beam for 30 minutes at an $Ar^+$ beam current of $\mu A$. Computer controlled time-averaged scans for the Cr $2p_{1/2}$, O 1s and Fe $2p_{1/2}$ regions are reproduced as FIGS. 3–5, respectively.

EXAMPLE VII

A sample coated according to Example IV, Experiment was analyzed by energy dispersive x-ray analysis by Midwest Research Microscopy, Inc., Post Office Box 6215, 5916 North Green Bay Avenue, Milwaukee, Wisconsin. The data obtained were presented in tabular form earlier in the specification.

EXAMPLE VIII

Stainless steel specimens (AISI 434) treated according to Example IV were phonographed under an electron microscope to determine the thickness of the oxide coatings thereon.

Samples judged visually as of moderate thickness had coatings 2–4 $\mu$ in thickness, whereas coatings visually judged as thick were up to about 4.5 $\mu$ thick by electron microscopic data.

What is claimed is:

1. A chromium-containing martensitic or ferritic stainless steel substrate coated with a firmly adherent compact and smooth black oxide coating consisting essentially of a substantial amount of sodium and $(Fe,Cr)_2O_3$ and $Fe_3O_4$ of a thickness from about 1.5 to about 4.5 microns.

2. The substrate of claim 1 containing a coating wherein up to 25% of sodium is found in the uppermost layer of the black oxide coating.

3. The substrate of claim 1 wherein said substrate is a component of a windshield wiper assembly.

4. The substrate of claim 3 wherein said substrate is an architectural panel.

5. The substrate of claim 1 wherein said substrate is a component of a solar energy absorptive device.

6. The substrate of claim 1 wherein the thickness of the coating is from about 2 to about 4 microns.

* * * * *